July 2, 1963  T. R. THOMAS  3,096,023
LUBRICATION
Filed Sept. 16, 1959  4 Sheets-Sheet 1
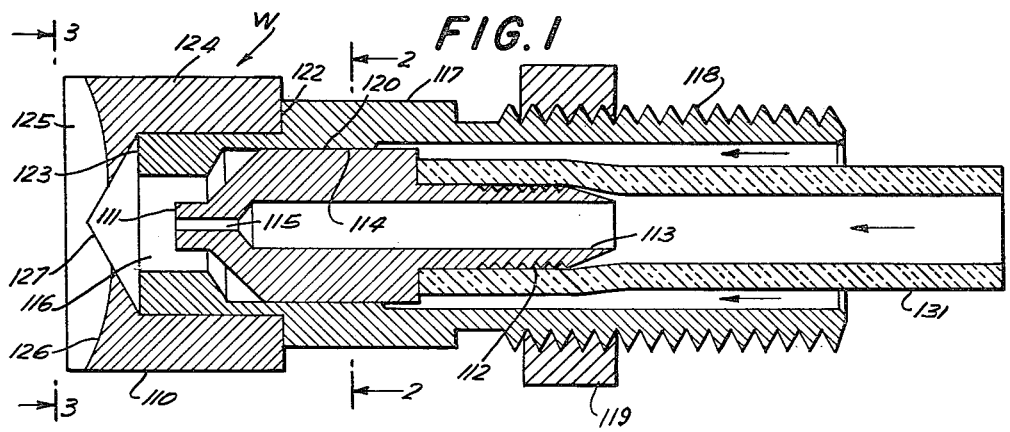
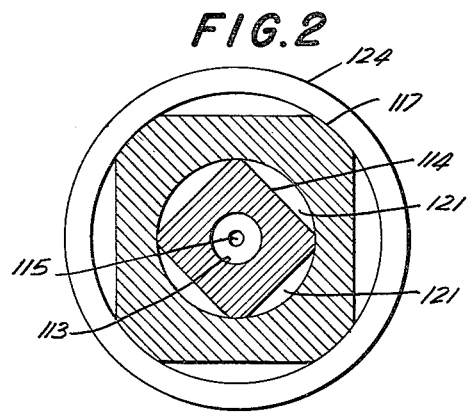
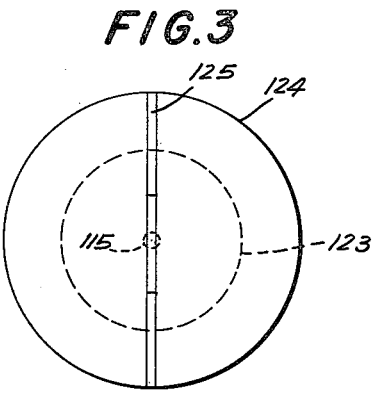
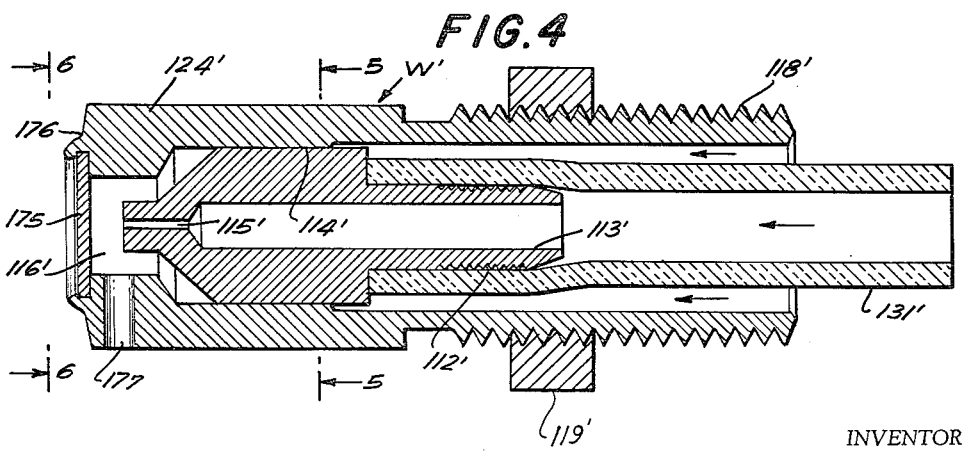
INVENTOR.
THOMAS R. THOMAS
BY
ATTORNEY July 2, 1963  T. R. THOMAS  3,096,023
LUBRICATION
Filed Sept. 16, 1959  4 Sheets-Sheet 2

INVENTOR.
THOMAS R. THOMAS
BY
ATTORNEY

July 2, 1963    T. R. THOMAS    3,096,023
LUBRICATION
Filed Sept. 16, 1959    4 Sheets-Sheet 4
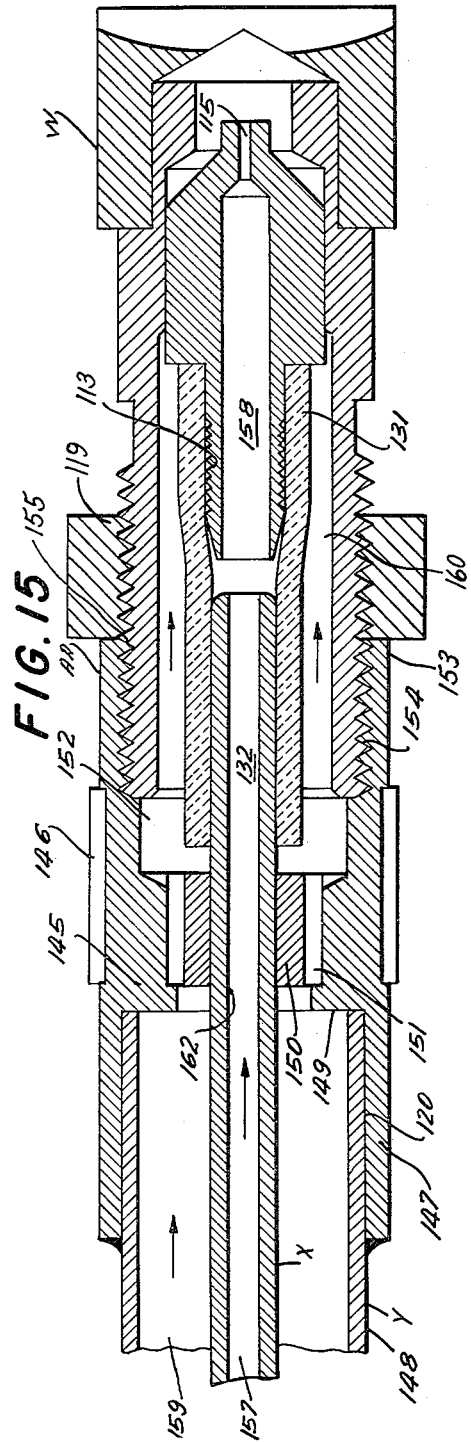
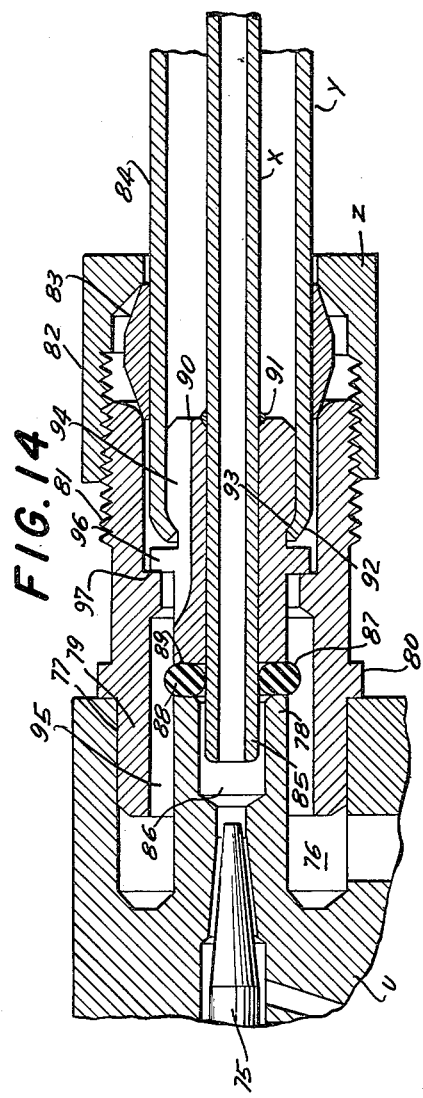
INVENTOR.
THOMAS R. THOMAS
BY
ATTORNEY __ United States Patent Office __ 3,096,023
Patented July 2, 1963

3,096,023
LUBRICATION
Thomas R. Thomas, New York, N.Y., assignor to Auto Research Corporation, Boonton, N.J., a corporation of Delaware
Filed Sept. 16, 1959, Ser. No. 840,449
9 Claims. (Cl. 239—424)

The present invention relates to a system for distributing lubricant or oil to chains, gears, and other machine parts, but it is particularly designed for the spray or mist application of coolants to cutting and grinding operations.

It is among the objects of the present invention to provide a simple, inexpensive, reliable distribution system of oil for application to chains, gears, and other machine parts or for spray or mist application of coolants to cutting or grinding operations in which there will be a central source and a plurality of remote distributing outlets at the point of application of the oil or coolant.

Another object of the present invention is to provide a simple, reliable distributing system which may be readily used with nearly all types of oils regardless of viscosities and changing temperature and humidity and which is also equally adaptable to a wide variety of standard water base coolants.

A further object of the present invention is to provide a distributing system in which compressed air and liquid under pressure will be supplied to a plurality of spaced and separated outlets for application to the machine part or cutting or grinding operation which is to receive the lubricant or coolant application.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it is desirable to provide a simple source of both air pressure and liquid with the air pressure being controlled and set at a predetermined value and acting to exert pressure and force the liquid to be distributed through distributing lines.

This central air pressure and liquid pressure source is shown in copending application Serial No. 738,128 filed May 27, 1958, of which the present application is particularly directed to the distributing system.

The central source will normally constitute a combination air trap, air pressure reduction unit and liquid pressurizing device. This central source will include in one compact unit a moisture trap, an air filter, a pressure regulator, a pressure gauge, a solenoid valve, the liquid reservoir, a liquid filter and a junction box.

From this central control unit parallel lines or concentric lines will extend to junction units which in turn will supply mixing valves in which the air and liquid or lubricant are combined to form a spray or mist which has a suitable adjustment to adjust the liquid flow, for example, by a needle valve.

These jet units may apply a jet directly onto the bearing or they may be provided with tube or hose connections to convey such jet to a unit.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIGURE 1 is a diagrammatic longitudinal sectional view of one type of outlet fitting showing the manner in which a flat spray is obtained.

FIG. 2 is a transverse vertical sectional view upon the line 2—2 of FIG. 1.

FIG. 3 is a front view of the nozzle taken upon the line 3—3 of FIG. 1.

FIG. 4 is a transverse longitudinal sectional view of an alternative embodiment in which the spray is diverted at an angle of 90° to the longitudinal axis of the fitting.

FIG. 14 is a longitudinal sectional view illustrating the manner in which the air and the oil or liquid coolant are transferred into the concentric system, upon a large scale as compared to FIGS. 12 and 13.

FIG. 15 is a longitudinal sectional view showing how the internal and external tubing connections may be made to the spray coolant outlet.

Figure 10:
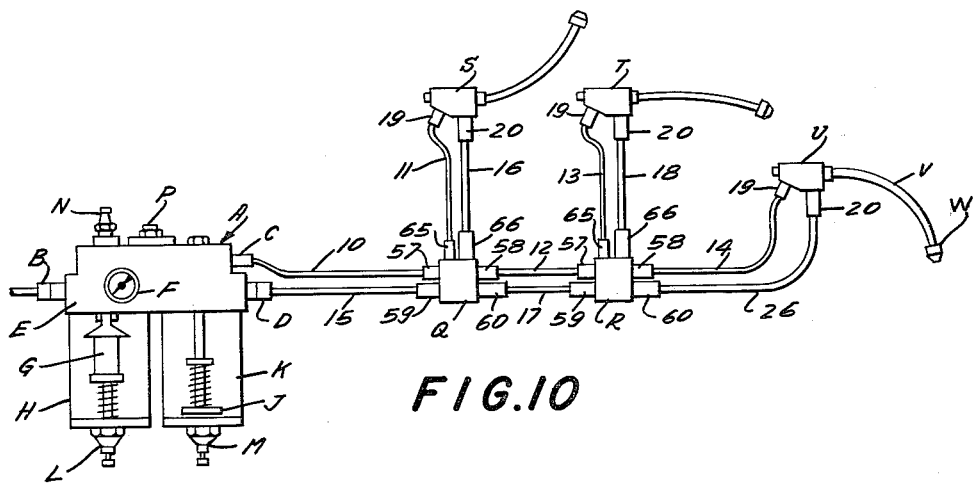
FIG. 10 is a diagrammatic layout view showing the distribution system which may be utilized in connection with the outlet fittings of FIGS. 1 through 9, respectively.
Figure 11:
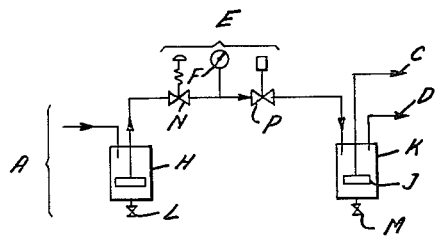
FIG. 11 is a further diagrammatic layout view more clearly describing the various functional arrangements of the central pressure source of FIG. 10.

Referring to FIGS. 10 and 11, there is shown a central source of air pressure and lubricant or liquid pressure A having an inlet B for compressed air, and an outlet C for the liquid under pressure and an outlet D for the compressed air from the central unit.

The head E receives a pressure gauge F and an air filter G, an air receptacle H, a liquid filter J, a liquid receptacle K and the drain cocks or valves L and M.

The drain cocks or valves L and M allow periodic removal of water and/or impurities which have been filtered out and deposited in the lower part of the receptacles H and K.

The central unit is also provided with a diaphragm pressure regulator N which is manually adjustable and a solenoid control valve P.

The liquid in the casing K will be under an air pressure and will be forced through the liquid outlet C under such air pressure.

The liquid will flow through the lines 10, 11, 12, 13 and 14 to and through the junctions Q and R and to the spray or mist units S, T and U.

The unit U has a tubular extension V to the remote spray outlet nozzle W.

The air will flow through the piping or tubing connections 15, 16, 17, 18 and 26 through and to the same junctions Q and R and also to the spray or mist outlets S, T and U.

Figure 7:
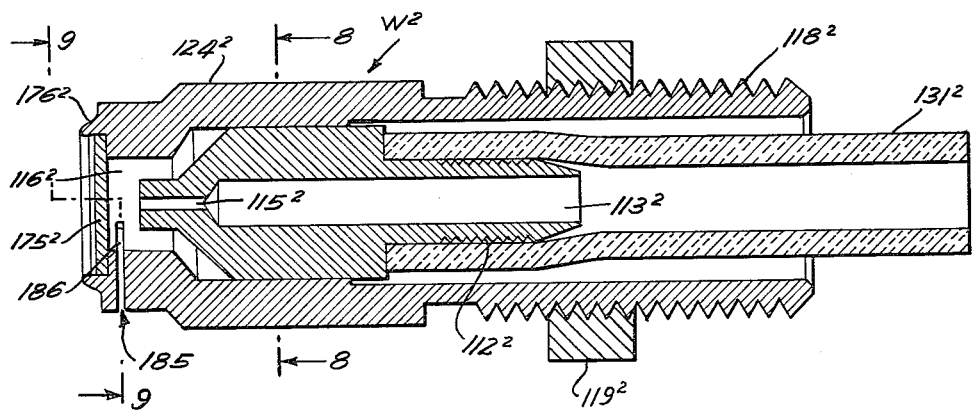
FIG. 7 is a longitudinal section view of an outlet fitting also giving an elongated fine type spray at 90° angle to the longitudinal axis.

The spray units are best shown in FIGS. 1, 4 and 7.

Figure 12:
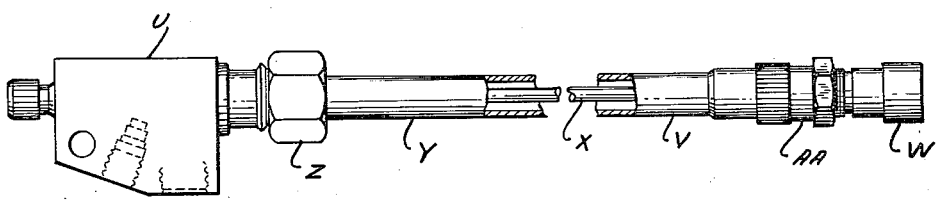
FIG. 12 is a side elevational view partly in section of a concentric tube arrangement showing the manner in which the air and lubricant are conveyed to the points of distribution.

In FIG. 12, it will be noted that there is an inside connection X for the air and an outside or outer connection Y which are concentrically disposed and which at each end have concentric connections Z and AA, respectively, to the unit U and to the tip W.

Figure 13:
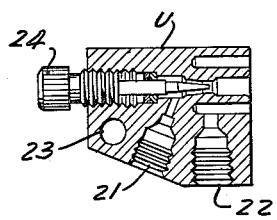
FIG. 13 is a transverse sectional view of a typical fitting which permits the flow of air and liquid whether lubricant or coolant into the concentric outlet pipe connection.

Referring to FIG. 13, the unit U which may be of the same construction as the units S and T shown in FIG. 10, is provided with the tapped recesses 21 and 22 which receive the coupling connections 19 and 20 and they are provided with openings 23 for mounting upon the structure.

The left side of the unit of FIG. 13 is provided with the liquid flow adjustment 24 which may take the form of a needle valve and will regulate the flow of liquid.

The junctions Q and R have a plurality of connections which permit air to flow from the lines 15 and 17 into the lines 16, 18 and 26 and oil or coolant to flow from the lines 10 and 12 into the lines 11, 13 and 14 to the final junctions S, T and U and they may be rectangular metal blocks with mounting openings.

Referring to FIG. 14, which shows the outlet from the junction U shown in side view in FIG. 12 and in section in FIG. 13, the connections are such as will enable flow of both the air and the liquid separately into the double tubular unit X—Y with the liquid flowing through the central opening and the air flowing through the outer tubular member Y.

There is a recess 77 and a projecting nipple 78. The recess 77 receives the connection 79 which is stopped by the shouldered enlargement 80.

The connection end Z also has a threaded end portion 81 which receives a compression coupling nut 82 to crimp the double tapered coupling sleeve 83 onto the inside end 84 of the outer tubular element Y. The outer tubular element Y encircles the inner tubular element X.

The inside end of X has an extension at 85 projecting into the recess 86 and a seal is made by the compressed rubber O-ring 87 which is compressed between the end 88 of the nipple 78 and the end 89 of the connection member 90.

The connection member 90 encircles the end 85 of the central element X and it is soldered in position at 91.

The end of the outer tubular element Y is turned inwardly as indicated at 92 to fit upon the inwardly bevelled portion 93 of the unit 90.

The slot 94 establishes the air connection from the chamber 76 and from the passageway 95 to the outer tube Y.

The shoulder or extension 96 will stop the unit 90 against the shoulder 91 of the body member Z.

Now referring to the outlet device of FIGS. 1 to 3, the outlet unit or tip W has an outer nozzle 110 and an inner nozzle 111.

The inside concentric tubing 131 fits onto the knurled nipple portion 112 of the rearwardly extending nipple 113 which has an enlarged body portion at 114 and a small orifice at its outlet end as indicated at 115 to force the lubricant into the chamber 116.

The outer body member 117 has a machine threaded portion 118 and it is connected in the manner shown in FIG. 15. The lock nut 119 can lock fan outlet slot 125 in any position required, when installed as shown in FIG. 12 or FIG. 15.

The body 117 has a central bore 120 which receives the polygonal body portion 114 of the central nozzle member so as to permit the air to flow through the spaces 121 as indicated in FIG. 2.

The body 117 has the shoulder 122 and the reduced diameter portion 123 on which is received the cap member 124 having the thin slot 125 with the curved bottom portion 126 which may consist of a saw cut, for example, as about .008″ in width and about .125″ in length.

The radius of the bottom 126 may be about ½″ while the angle formed by the sides 127 of the inside slot may be about 118°.

The slot 125 will give a fan spray of coolant liquid from the end of the nozzle and in the direction of the longitudinal axis of the nozzle.

Referring to FIG. 15, which shows the manner in which the air and liquid coolant connections are made to the fan spray tip assembly of FIG. 1.

The inside tube X of FIG. 15 and the outside tube Y will continue into the structure 145 having the knurling at 146. The structure 145 has a rearwardly extending sleeve 147 which receives the end 148 of the tubing Y.

The shoulder 149 at the inner end of the tubular projection 147 will act as an abutment for the end 148 of the outer tube Y.

The body 145 receives a central sleeve 150 which fits upon the portion 162 of the inner tube X. There are outer passageways 151 which permit the air to flow into the chamber or space 152.

The end 153 of the member AA has an internal portion 154 which screws onto the threaded portion 155 at the end of the tip W.

If desired the outer face 156 of the tip W may be knurled to enable it to be gripped while threaded into the socket 154.

The flexible sleeve or tube 131 will fit over the end 132 of the inner tubing X and also over the end 113 of the inside nipple member.

The coolant will flow through the center passage 157 to the nozzle chamber 158 and into the passage 115 where it will be drawn outwardly by the air which is flowing through the concentric passage 159, the openings 151 and the passageway 160, inside the concentric passageway 121 inside of the tip W and into the chamber 116. This will produce a fan spray effect.

Figure 5:
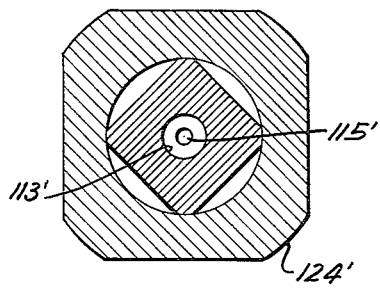
FIG. 5 is a transverse sectional view upon the line 5—5 of FIG. 4.
Figure 6:
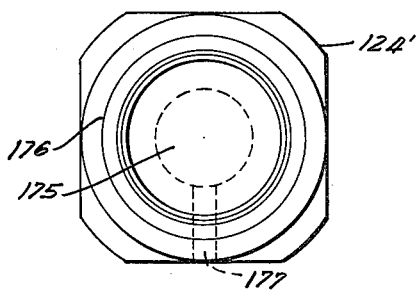
FIG. 6 is a front elevational view taken from the line 6—6 of FIG. 4.

In the alternative form of the invention as shown in FIGS. 4, 5 and 6, similarly functioning parts as in FIGS. 1, 2 and 3 are referred to by the same numerals and letters primed ('d).

The tip W' receives the coolant which is forced through the passageway 115' into the chamber 116' where it strikes the plate 175 which closes the end of the chamber 116' and is held in the end 176 of the cap member 124'.

As a result the spray will be forced to pass through the side passageway 177 in the body 124' to give a side spray effect or a side outlet.

In the alternative embodiment of FIGS. 7 to 9 similarly functioning parts to those described in connection with FIGS. 1 to 6 will be described by the same letters and numerals provided with the superior "2."

In this embodiment the plate $175^2$ is held in position by the swaged-over portion $176^2$ and closes off the chamber $116^2$.

The side of the end of the body $124^2$ is provided with a slot 185 which at its base 186 extends through about ⅓ to ½ of the chamber $116^2$.

Figure 8:
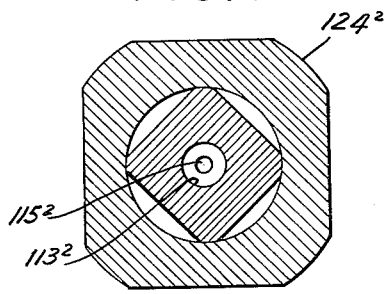
FIG. 8 is a transverse sectional view taken upon the line 8—8 of FIG. 7.
Figure 9:
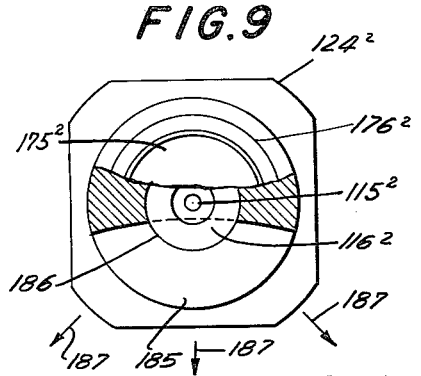
FIG. 9 is a front elevational partial sectional view taken from the line 9—9 of FIG. 7.

The type of fitting as shown in FIGS. 7 to 9 will form a side fan spray over an angle of about 100 to 140° in the direction indicated by the arrows 187 of FIG. 9.

The embodiment of FIGS. 1 to 9 will thus permit various directional sprays of coolant fluid to be directed upon a bearing at the places and locations desired and in connection with various types of machine tools as have been previously described in connection with my application Serial No. 731,908.

By suitable mounting of the tip W in and about the machine, a predetermined pattern of spray of coolant may be achieved directed upon the working parts.

The spray of the coolant may also be directed in other patterns than described in connection with FIGS. 1 to 9 and in addition to fan shape patterns by changing the shape, direction and distribution of the slots 125 and 185 and the direction or number of passageways 177 a varying distribution of spray and pattern of spray distribution may be obtained.

Either a circular spray pattern may be achieved or various types of elongated triangular spray patterns may be achieved depending upon the shape and size of the cutting operation and the character of the machine tool to which the spray system is applied.

While there has been herein described a preferred form of the invention, it should be understood that the same may be altered in details and in relative arrangement of parts within the scope of the appended claims.

The present application is a continuation-in-part of application Serial No. 731,908, filed April 30, 1958.

Having now particularly described and ascertained the nature of the invention, and in what manner the same is to be performed, what is claimed is:

1. In a system for applying a controlled finely divided coolant to a place of machining by a machine tool of the type having a central air pressure and liquid coolant supply with parallel separate lines leading from said central supply to said place; the combination therewith of an outlet unit having concentric cylindrical inside and outside conduits with an outer annular air conduit and an inside central liquid coolant conduit, an inside nozzle unit having a central axial passageway with inlet and outlet nozzles, said inlet nozzle receiving said inside conduit and forming a fluid tight connection therewith, an outside tubular member having a central axial passageway receiving said nozzle unit and having inlet and outlet connections, said outlet connection having a central cylindrical chamber receiving the outlet nozzle of the nozzle unit and a closure closing off said central chamber and said outlet connection and said outside tubular member and closure having means to direct the flow of the finely divided coolant.

2. The system of claim 1, said closure consisting of an end plate closing said central cylindrical chamber and said last mentioned means consisting of an opening in the side of said cylindrical chamber.

3. The system of claim 1, said closure consisting of an end cap having an inside conical chamber in communication with and serving as an outlet for said central cylindrical chamber and a slot extending diametrically across said closure transverse to the axis of said nozzle unit and said tubular member.

4. The system of claim 1, said inside nozzle unit terminating substantially short of said central cylindrical chamber and said outlet nozzle projecting into one side of said central cylindrical chamber and terminating about the middle of said chamber.

5. In a system for applying a controlled finely divided coolant to a place of machining by a machine tool, of the type having a central air pressure and liquid coolant supply with parallel separate lines leading from said central supply to said place; the combination therewith of an outlet unit having a control junction for receiving the air and coolant under pressure from the parallel lines and provided with adjustment means for control of coolant flow, concentric cylindrical inside and outside conduits connected to and supplied from said control junction, said concentric conduits including an outer annular air conduit and an inside central liquid coolant conduit, an inside nozzle unit having a central axial passageway with inlet and outlet nozzles, said inlet nozzle receiving said outlet end of said inside conduit and forming a fluid tight connection therewith, an outside tubular member having a central axial passageway receiving said nozzle unit and having inlet connection to the outlet end of the outside conduit and an outlet connection, said outlet connection having a central cylindrical chamber in which the finely divided coolant is formed receiving the outlet nozzle of the nozzle unit and a closure closing off said central chamber and said outlet connection, and said outside tubular member and said closure forming means to control the pattern of and area of application of the finely divided coolant.

6. The system of claim 5, said closure consisting of an end plate closing said central cylindrical chamber and said last mentioned means consisting of an opening in the side of said cylindrical chamber.

7. The system of claim 5, said closure consisting of an end cap having an inside conical chamber in communication with and serving as an outlet for said central cylindrical chamber and a slot extending diametrically across said closure transverse to the axis of said nozzle unit and said tubular member.

8. The system of claim 5, said inside nozzle unit terminating substantially short of said central cylindrical chamber and said outlet nozzle projecting into one end of said central cylindrical chamber and terminating about the middle of said chamber.

9. In a coolant distribution system for a machine metal working operation for distributing through a dual conduit system air under pressure and coolant liquid under said same air pressure through separate conduits and mixing the air and coolant at the point of application to the metal working operation and having a coolant flow regulator junction at the outlets of the dual conduit system, a flexible inside coolant conduit and an outside air pressure conduit and a mixer and spray tip at the outlet of the concentric system comprising an inside nozzle body having a reduced diameter centrally bored outlet end tip portion and reduced diameter inlet end portion connected to the inside conduit and also provided with an intermediate polygonal-cross-section body portion, an outside encircling nozzle body having an externally threaded inlet portion receiving air under pressure from the air pressure conduit, a central interior chamber to receive and tightly contact the polygonal body portion and a reduced diameter forwardly projecting outlet portion having a central interior cylindrical opening and a cap portion fitting upon and encircling the outlet portion, said central chamber forming a mixer chamber and said polygonal portion within the nozzle body a plurality of spaced separate outlet air pressure passageways from the air conduit into the mixer chamber, a decreasing diameter air pressure passageway from the separate passageways into the mixer chamber, a decreasing diameter passageway from the inside coolant conduit into the mixer chamber, said cap portion at the outlet of the mixer chamber having a restricted spray directing orifice to direct the finely divided mixture of air and coolant onto metal working operation in a specific pattern.

References Cited in the file of this patent
UNITED STATES PATENTS

| | | |
|---|---|---|
| 345,659 | Reichardt | July 13, 1886 |
| 584,864 | Fisher | June 22, 1897 |
| 1,199,149 | Best | Sept. 26, 1916 |
| 1,642,418 | Kovanda et al. | Sept. 13, 1927 |
| 2,024,936 | Loughlin | Dec. 17, 1935 |
| 2,140,188 | Marsh | Dec. 13, 1938 |
| 2,868,584 | Faust | Jan. 13, 1959 |
| 2,895,684 | Harr | July 21, 1959 |